3,177,716
INSTRUMENT FOR DETERMINING DEW-POINT
Joseph M. Warman, Oconomowoc, Wis., assignor to Basic Products Corporation, Milwaukee, Wis., a corporation of Wisconsin
Filed Mar. 14, 1961, Ser. No. 95,711
1 Claim. (Cl. 73—335)

The present invention relates to an instrument for determining the dew-point of a gas mixture and especially to an instrument which is self-contained and portable.

Oftentimes in industry, as well as in the laboratory, it is necessary to determine the dew-point of a gas mixture or of the atmosphere. Knowing the dew-point and the ambient temperature, it is then possible by means of psychrometric tables to determine the moisture content of the mixture or of the atmosphere. The dew-point may be determined by observing the formation of dew upon a mirror surface which has been cooled to a known temperature which is at or below the dew-point temperature. As the temperature of the mirror surface is lowered, the formation of dew begins and the temperature of the mirror at this point is observed in order to determine the dew-point.

In dew-point instruments, it is often necessary that the means for reducing the temperature of the mirror surface be simple and compact, and oftentimes portable. In prior devices, a receptacle has been attached to the mirror surface and filled with, and subjected to, a very volatile liquid so that the mirror surface may be lowered in temperature by the evaporative cooling effect. In other devices, liquids having low freezing points, such as acetone, have been gradually lowered in temperature by the addition of solid carbon dioxide or Dry Ice in a controlled manner. Each of the devices employing a liquid within the chamber adjacent the mirror surface are subject to the difficulty of handling the liquid whenever the dew-point instrument is to be moved from one place to another. Devices employing a liquid which is progressively reduced in temperature by the addition of Dry Ice or the equivalent require difficult hand operation and continuous attention from the operator.

One of the objects of the present invention is to provide a dew-point instrument in which the mirror surface is cooled by the expansion of a compressed gas.

Another of the objects of the invention is to provide a dew-point instrument in which the mirror surface and the means for admitting the cooling gas to it are attached to a portable supply of compressed gas.

According to one aspect of the invention, the apparatus for determining the dew-point may include a chamber containing the gas sample whose dew-point is to be determined. The walls of the chamber are substantially transparent to permit the passage of light to its interior. Within the chamber, a light reflecting surface is exposed to the gas sample. The apparatus also includes means for indicating the temperature of the reflecting surface as well as means for cooling it, at least to the dew-point of the gas sample. With such an apparatus, the formation of dew on the reflecting surface at a known temperature may be determined.

In another embodiment of the invention, the apparatus includes the assembly of the chamber means, the light reflecting surface therein, the means for indicating the temperature of the surface, and the means for cooling the surface being mounted adjacent to a supply of compressed gas which is connected to the means for cooling the surface.

These and other objects, advantages and features of the invention will become apparent from the following description and drawings, which are merely exemplary.

Figure 1:
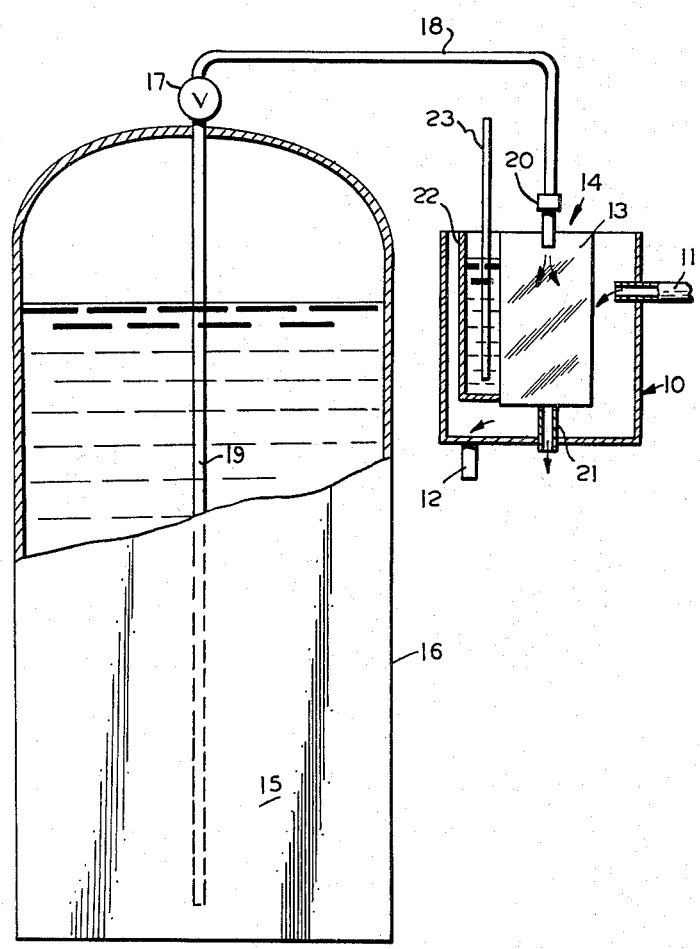
FIG. 1 is a schematic representation of the apparatus for determining the dew-point of the gas mixture.

The dew-point instrument is shown in schematic form in FIG. 1. The chamber means for the apparatus which is adapted to receive a gas sample whose dew-point is to be determined may include chamber 10 constructed from transparent material such as glass or plastic. For the case where the dew-point of a continually flowing gas is to be determined, the gas sample is admitted to chamber 10 by means of inlet pipe 11 which intersects the wall of the chamber adjacent to its upper portion. The discharge of the sample gas flowing through chamber 10 is made through discharge pipe 12 which may intersect the bottom portion of chamber 10. In FIG. 1, the arrows adjacent to inlet pipe 11 and discharge pipe 12 indicate the direction of flow of the sample gas.

The surface within chamber 10 to be cooled may include reflecting surface 13 of cooling chamber 14. Reflecting surface 13 is exposed to the interior portion of chamber 10. The reflecting surface may be of a mirror-like finish. In the investigation and determination of the dew-point of a gas sample, it is necessary that the surface upon which dew is to form be provided with means for cooling that surface below the dew-point temperature of the gas sample. In the apparatus of the invention, cooling chamber 14 as well as reflecting surface 13 of it may be cooled by the expansion of a compressed gas, such as liquid carbon dioxide. The compressed carbon dioxide 15 in liquid form may be stored in a suitable pressure vessel 16 which is connected to the cooling chamber 14 by means of throttle valve 17 and pipe 18. To insure that liquid carbon dioxide is delivered to the outlet of throttle valve 17, internal pipe 19 may be provided to extend beneath the surface of the carbon dioxide stored in pressure vessel 16.

Pipe 18 is connected to cooling chamber 14 by means of expansion orifice 20 located at the entrance of pipe 18 into cooling chamber 14. The expansion orifice may consist of a porous plug or a plug member formed from leather or similar material. The expansion orifice serves as the second point of expansion of the pressured carbon dioxide. The first point of expansion is that at throttle valve 17. The expansion of the pressured gas through expansion orifice 20 is accompanied by a considerable drop in temperature of the gas according to well-known thermodynamic principles. The resulting flow of cold gas enters cooling chamber 14 and causes the reduction of the temperature of the chamber as well as that of reflecting surface 13. Following the expansion of the gas and flow through cooling chamber 14 as indicated by the arrows in FIG. 1, the gas may pass outwardly to the atmosphere through discharge pipe 21 located adjacent to the bottom portions of cooling chamber 14 and chamber 10.

Adjustment of throttle valve 17 determines the weight-flow of gas which is permitted to pass through pipe 18 to expansion orifice 20 and also the degree of expansion which occurs at throttle valve 17 and expansion orifice 20. Consequently, adjustment of throttle valve 17 is the means by which the temperature of cooling chamber 14 may be reduced in a controlled manner. Adjacent to cooling chamber 14 is located well 22 which is adapted to receive temperature indicating means such as thermometer 23. Well 22 is formed from conductive material so that the temperature of the well corresponds to that of cooling chamber 14 as well as reflecting surface 13. To promote heat transfer relative to thermometer 23 and to insure that the thermometer indicates the temperature of the well itself, well 22 may be filled with a liquid having a low freezing point, such as alcohol.

*Operation*

In order to determine the dew-point of a gas sample, the gas sample is connected to inlet pipe 11 and permitted to flow through chamber 10 and then to discharge through outlet pipe 12.

Throttle valve 17 is then partially opened so as to commence the flow of the compressed gas through pipe 18 and expansion orifice 20 so that the gas expands into cooling chamber 14 and begins to cool it. The operator then observes thermometer 23 until he notes that an equilibrium condition of temperature for cooling chamber 14 has been reached. With the temperature of reflecting surface 13 above the dew-point of the gas flowing through chamber 10, the observer will see that there is no dew formation upon reflecting surface 13. The transparent walls of chamber 10 enable the observer to view reflecting surface 13 in a very detailed manner.

The observer then may adjust throttle valve 17 to increase the gas flow through expansion orifice 20 in order to increase the rate of cooling of chamber 14. While this is happening the observer continues to watch the reflecting surface through the transparent walls of chamber 10 so that he will be aware of the first formation of dew upon the reflecting surface. With proper adjustment of throttle valve 17, the temperature of cooling chamber 14 may be reduced at a rate which thermometer 23 can substantially follow. At the instant the dew forms upon reflecting surface 13, the observer is immediately aware of it due to the change in the reflecting power of the surface. Upon observing the formation of dew, the observer merely records the temperature reading indicated by thermometer 23 in order to determine the temperature of the reflecting surface at which the dew formation took place. This temperature obviously is that defined as the dew-point.

The fact that thermometer 23 extends from well 22 and that the transparent walls of chamber 10 provide a large viewing angle of the reflecting surface 13, it is obvious that the observer may see the dew formation at a distance from the apparatus in an efficient and accurate manner.

Figure 2:
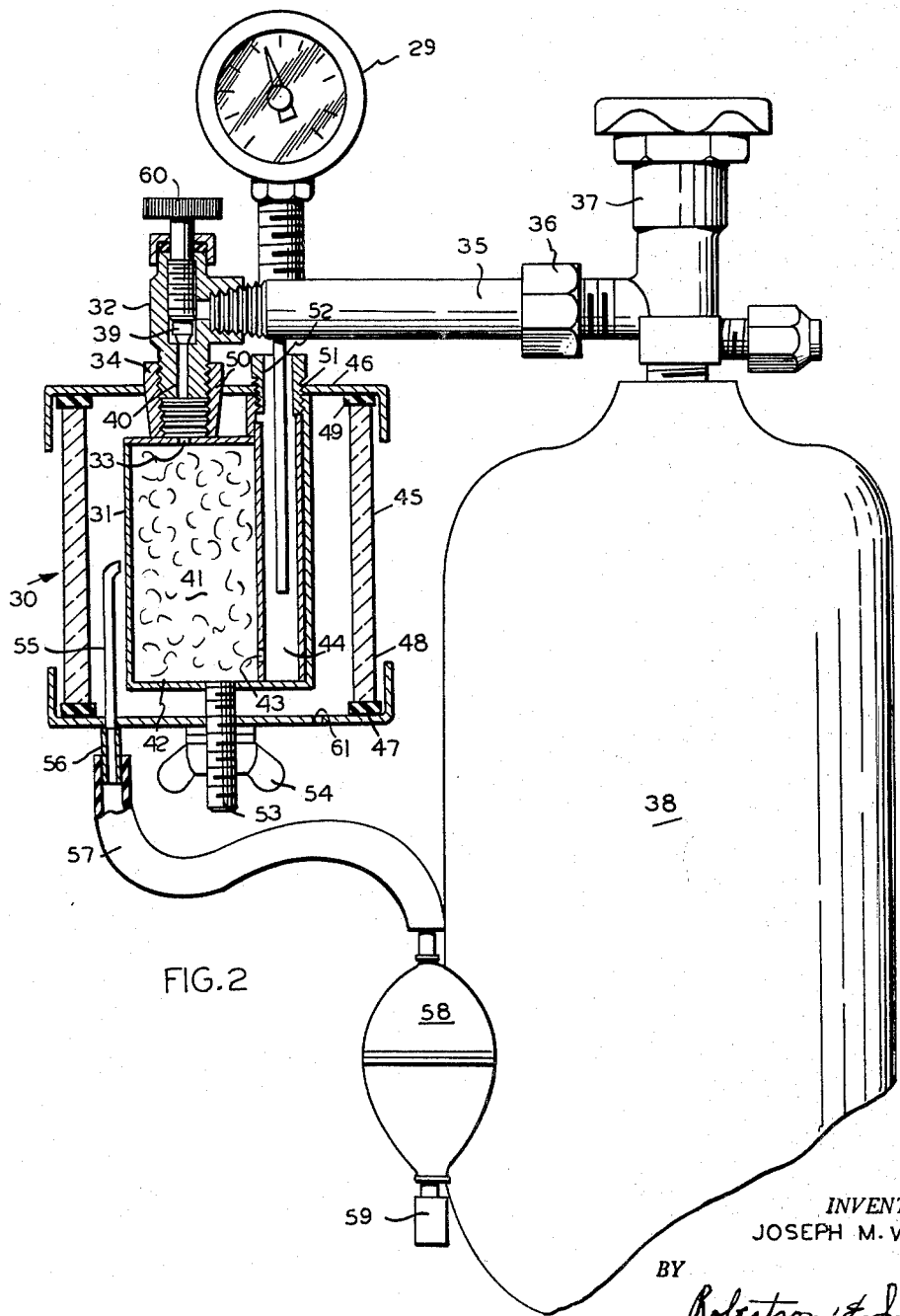
FIG. 2 is a fragmentary sectional view, of another embodiment of the dew-point apparatus.

In FIG. 2 there is shown another embodiment of the invention. The dew-point instrument assembly 30 includes inner chamber 31 which is connected through opening 33 and coupling 34 to control valve 32. Control valve 32 is attached to pipe 35, which is connected by means of coupling 36 to valve 37 of gas cylinder 38. With valve 37 in the open position, control valve 32, by virtue of the adjustment of its valve core 39, can control the flow of compressed gas from the cylinder through passage 40 into the interior portion 41 of the inner chamber, said passage having a porous or leather plug therein. The expansion of the compressed gas through control valve 32 and passage 40 is accompanied by a cooling effect which serves to lower the temperature of copper wool 42 within inner chamber 31. The copper wool insures that the walls of the inner chamber are uniformly reduced in temperature by the expanding gas. The expanded gas then passes through opening 43 into well 44 which communicates with the outside of the chamber. In order to enhance the reflection of light from the outer surfaces of inner chamber 31, these surfaces may be provided with a mirror-like finish by chrome plating or other known techniques. In order to determine the temperature of the surface of the inner chamber, the bulb or sensing element of a dial thermometer 29 may be inserted into the interior portion of well 44.

Inner chamber 31 is enclosed within outer chamber 45 which includes top plate 46 and bottom plate 47 adjacent to sight glass 48. To effect a tight seal, gaskets 49 may be disposed between the end portions of the sight glass and the adjacent plates. Top plate 46 is provided with suitable openings 50 and 51 to receive coupling 34 of the control valve and coupling 52 extending from well 44. The bottom portion of inner chamber 31 may be provided with stud 53 extending through bottom plate 47. By means of wing nut 54 mounted upon stud 53, the end plates may be drawn toward one another to compress gaskets 49 and insure a tight assembly. The bottom plate and tube 55 may be rotated so as to present a clean surface.

Gas samples are directed into the region between inner chamber 31 and the inner surfaces of sight glass 48 by means of pipe 55 which extends through the bottom plate and has an upper portion directed toward and spaced from the outer surface of the inner chamber. The portion of the pipe without bottom plate 47 is provided with sleeve 56 which is adapted to be connected with hose 57 which leads to bulb 58. The bulb is provided with hose 59 at its intake side. The gas flowing through pipe 55 travels along the surface of the inner chamber and subsequently leaves the dew-point assembly through vent hole 61.

In order to determine the dew-point of a gas sample, a pre-determined upper reference temperature is initially established at the outer surfaces of inner chamber 31, as indicated by dial thermometer 29. With valve 37 open, the compressed gas within gas cylinder 38 may pass through pipe 35 to control valve 32. By means of knob 60, the operator can adjust valve core 39 to initiate a flow of gas through passage 40 so that it expands into interior portion 41 of the inner chamber. The dissipation of heat by the expansion of the gas decreases the temperature of copper wool 42 disposed within the chamber and thereby decreases the temperature of the mirror outer surface of the chamber. After expansion, the gas can flow through opening 43 and through well 44 to the outer atmosphere.

When a predetermined decreased temperature has been reached, the operator can begin to admit the sample gas to the assembly by operating bulb 58. The sample gas passes through pipe 55 which directs it toward the surface of the inner chamber. The operator can then observe the mirror surface through sight glass 48 to see if a formation of dew results. The lack of dew indicates that the dew-point has not as yet been reached. Under such a condition, it is necessary to further adjust valve core 39 to increase the flow of gas into the chamber and reduce its temperature in increments, as indicated by dial thermometer 29. This process is continued until a temperature is reached at which the dew formation begins.

It is evident that a compact, portable apparatus has been achieved since the dew-point assembly 30 is conveniently mounted adjacent to gas cylinder 38 and valve 37. At the termination of the test, the operator need merely shut off valve 37 and then open valve 32 so that the inner chamber may be vented. At the same time, bulb 58 may be operated to force air or other gas into the assembly to purge its interior of the sample gas.

It is to be understood that the described exemplary embodiments are merely intended for the purpose of illustration and that the principles of the invention are not intended to be limited thereto, except as defined in the appended claim.

What is claimed is:

Apparatus for determining the dew-point of a gas including outer chamber means adapted to contain a gas sample, the walls of said outer chamber means being substantially transparent, inner chamber means disposed concentrically within said outer chamber means, said inner chamber means having a wall portion exposed within the interior of said outer chamber means, the surface of said wall portion exposed to the interior of said outer chamber means being light-reflective, means for indicating the temperature of the surface of said wall portion, manually operable valve means within a passage means communicating with said inner chamber means for controlling the flow of a refrigerant to the interior of said chamber means for cooling the surface of said wall portion at least to the dew-point of said gas sample, and a plug of leather within said passage means between said valve means and chamber means for providing a considerable drop in temperature of said refrigerant as it enters said chamber means, whereby the formation of dew on the surface of said wall portion at a known temperature of said surface is determined.

References Cited in the file of this patent

UNITED STATES PATENTS

| | | |
|---|---|---|
| 1,876,915 | Gordon | Sept. 13, 1932 |
| 2,624,195 | Van Alen | Jan. 6, 1953 |
| 2,758,470 | Hartmann | Aug. 14, 1956 |
| 2,829,363 | Obermaier et al. | Apr. 1, 1958 |
| 2,987,918 | Hanna | June 13, 1961 |